United States Patent
Peterson

(10) Patent No.: US 10,895,196 B2
(45) Date of Patent: Jan. 19, 2021

(54) SUPERCHARGER CHARGE AIR COOLER WITH IMPROVED AIR FLOW CHARACTERISTICS

(71) Applicant: Magnuson Products, LLC, Ventura, CA (US)

(72) Inventor: Owen Peterson, Ventura, CA (US)

(73) Assignee: Magnuson Products, LLC, Ventura, CA (US)

( * ) Notice: Subject to any disclaimer, the term of this patent is extended or adjusted under 35 U.S.C. 154(b) by 20 days.

(21) Appl. No.: 16/355,789

(22) Filed: Mar. 17, 2019

(65) Prior Publication Data

US 2019/0284989 A1    Sep. 19, 2019

Related U.S. Application Data

(60) Provisional application No. 62/645,125, filed on Mar. 19, 2018.

(51) Int. Cl.
| | |
|---|---|
| *F02B 29/04* | (2006.01) |
| *F28F 1/04* | (2006.01) |
| *F28D 1/053* | (2006.01) |
| *F28D 21/00* | (2006.01) |

(52) U.S. Cl.
CPC ...... *F02B 29/0456* (2013.01); *F02B 29/0418* (2013.01); *F02B 29/0493* (2013.01); *F28D 1/05383* (2013.01); *F28F 1/045* (2013.01); *F28D 2021/0082* (2013.01)

(58) Field of Classification Search
CPC .............. F02B 29/0412; F02B 29/0418; F02B 29/0437; F02B 29/0456; F02B 29/0462; F02B 29/0493; F28D 1/0435; F28D 1/05366; F28D 1/05383; F28D 1/05391;
(Continued)

(56) References Cited

U.S. PATENT DOCUMENTS

| | | | |
|---|---|---|---|
| 2006/0102329 A1* | 5/2006 | Taras .................... | F28F 9/0268 165/146 |
| 2012/0291998 A1* | 11/2012 | Anderson ................. | F28F 1/14 165/104.14 |

(Continued)

*Primary Examiner* — Brandon D Lee

(57) ABSTRACT

A charge air cooler, e.g., as used with a supercharger having meshing rotors in sealing contact with a housing, the housing having an inlet port to admit air into the meshing rotors and the housing having an outlet port to expel air from the meshing rotors, the charge air cooler having an inlet-side core for transmitting the flow of pressurized air, and an outlet-side core receiving the flow of pressurized air transmitted from the inlet-side core and further transmitting the flow of pressurized air, each core having coolant conduits and fins joined to the coolant conduits for contact with the flow of pressurized air, the fins being arranged with a predetermined density, wherein the inlet-side core fin density is lower than the outlet-side core fin density, whereby the inlet-side core presents less resistance to the flow of pressurized air than the outlet-side core and the outlet-side core presents greater surface area for heat conductance from the flow of pressurized air than the inlet-side core. Charge air coolers with this configuration provide improved pressure and temperature characteristics in a supercharger's flow of pressurized air to an engine.

12 Claims, 6 Drawing Sheets

(58) Field of Classification Search
CPC . F28D 7/1623; F28D 2021/0082; F28F 1/045
See application file for complete search history.

(56) References Cited

U.S. PATENT DOCUMENTS

| | | | |
|---|---|---|---|
| 2013/0067912 A1* | 3/2013 | Eilemann | F02B 29/0462 60/599 |
| 2014/0042234 A1* | 2/2014 | Moser | F28D 1/0435 237/12.4 |
| 2015/0075750 A1* | 3/2015 | Bruggesser | F02B 29/0462 165/104.14 |
| 2016/0047340 A1* | 2/2016 | Mahalatkar | F02B 29/0406 123/568.12 |

* cited by examiner

SUPERCHARGER CHARGE AIR COOLER WITH IMPROVED AIR FLOW CHARACTERISTICS

PRIORITY

This application claims priority to U.S. provisional patent application 62/645,125 filed Mar. 19, 2017, incorporated herein by reference.

FIELD OF THE INVENTION

The present invention relates to heat exchangers and more particularly to heat exchangers known as intercoolers or charge air coolers used in supercharger applications.

BACKGROUND OF THE INVENTION

A supercharger is a forced induction device generally designed to increase airflow in an internal combustion engine. A common type of supercharger is a Roots-type supercharger in which meshing rotors driven from an engine crankshaft pump air into an engine's combustion chambers. The air discharged by the rotors, at increased pressure, provides greater oxygen density which, when mixed with fuel, provides a greater quantity of combustible mixture, an increased force during combustion, and therefore increased power output from the engine.

As air is pumped through a supercharger it increases in pressure but also in temperature, and because air behaves for present purposes according to the ideal gas law, its increased pressure and temperature bring about a corresponding increase in volume (corresponding to an increase in air flow, usually measured in CFM, cubic feet per minute) and reduction in density. Such reduced-density air, with reduced oxygen density, has a lessened ability to combine with fuel to produce forceful combustion.

Accordingly, supercharger design frequently incorporates a charge air cooler positioned in the path of the pressurized air (usually just downstream of the rotors) to withdraw heat from the pressurized air and to lower its temperature and velocity and increase its density before it is introduced into a combustion chamber. Compared to an uncooled device, the cooled, higher density air at the exit of the charge air cooler provides more forceful combustion and enhanced performance. Passing a compressed and heated intake charge through a charge air cooler reduces not only its temperature (due to heat transfer) but also its pressure (due to flow restriction). If the device is properly engineered, the relative decrease in temperature is greater than the relative loss in pressure, resulting in a net increase in density.

A typical charge air cooler conventionally employs a heat exchanger configuration with coolant conduits (to carry coolant circulated from an external radiator), with the conduits being thermally connected to fins that provide an increased surface area for contact with the heated pressurized air flowing through the charge air cooler. As the (heated) air flows through the charge air cooler, it comes into contact with the (cooler) fins, transfers heat to the fins and from fins to the circulating coolant, and emerges from the charge air cooler at lower temperature and higher density.

In many practical prior art embodiments the supercharger charge air cooler has two cooling stages presenting approximately the same cross-sectional area to the flow of air, formed with an inlet-side core that first contacts the flow of pressurized air and an outlet-side core that receives air that has passed through the inlet-side core, with the coolant taking a path that first flows through the outlet-side core and then through the inlet-side core, with the coolant absorbing heat from the pressurized air as it passes through each core, and then passing the absorbed heat in the coolant to and through an external radiator which then transfers the heat from the coolant to the external environment, with a pump recirculating the coolant back to the charge air cooler.

Several design characteristics are desirable in such a charge air cooler:

a. First, high thermal efficiency, defined as the ability of the device to extract heat from the air flowing through it. This is measured in relation to the ambient air temperature. For one example, if the ambient air temperature is 70° F. and the engine is running at 5500 RPM at 14.7 psi of boost pressure, the air entering the supercharger will be in the range of 75-85° F. (accounting for heat absorbed from engine compartment). During compression in the supercharger the air is heated (adiabatic process) to the range of 230-260° F. This hot intake air then passes through the charge air cooler where heat, if the charge air cooler is properly designed, is removed. The closer the post-charge air cooler intake air temperature gets to the ambient air temperature the more thermally efficient the charge air cooler.

b. Second, high pressure efficiency, defined as the ability of the device to transfer air from input to output without supplying resistance that impedes air flow and reduces output pressure. Pressure efficiency, also commonly known as Pressure Drop, is the measure of the internal air flow resistance of the charge air cooler or how much energy or boost pressure is lost as the intake air passes through the charge air cooler system. Resistance at the charge air cooler core is directly related to two elements: internal flow area and internal resistance. Internal flow area is the amount of space available for the air to move through the core. The larger the internal flow area, the lower the resistance and the lower the pressure drop. The smaller the area, the higher the resistance and higher the pressure drop. Internal resistance is the resistance encountered within the charge air cooler core. This is primarily the result of the internal cooling fin design and density.

c. Third, high volumetric efficiency, the ratio (or percentage) of the mass of air and fuel that is trapped by the cylinder during induction divided by the mass that would occupy the displaced volume if the air density in the cylinder were equal to the ambient air density. Volumetric efficiency can be improved by improvements in thermal efficiency (reducing temperature and therefore increasing density) and pressure efficiency (increasing pressure and therefore increasing density).

d. All the foregoing factors affect overall supercharger efficiency, the ratio of power increases produced by the supercharger to the power losses consumed by operating the supercharger. Lower air flow resistance from high pressure efficiency improves overall supercharger efficiency because it means that the supercharger requires less power simply to push the air through the restrictive path of the charge air cooler, and higher thermal efficiency means that the density of the supercharged air is higher and produces more output power.

e. Fourth, improved durability, the ability of the charge air cooler to withstand the pulsating impact of the pressurized air upon the fins without failure, which contributes to longer service life.

It would be desirable to provide a charge air cooler that would achieve improvements in all these characteristics; however, their effects are somewhat at odds with one another. For example, thinner fins and increased fin density increase thermal efficiency, but at the cost of reduced durability and increased resistance to air flow.

Still another challenge faced in charge air cooler design is achieving uniform air flow over the entire area of the charge air cooler. Usually, pressurized air emitted from the rotors arrives at the charge air cooler with a smaller cross-sectional area than is desired to be emitted from the charge air cooler to the engine manifold. Typically, flow at the entrance and exit of the charge air cooler is equalized by providing an entrance and exit plenum or volume where the pressurized air is allowed to redistribute and equalize (as well as an intermediate volume between cores in charge air coolers with two cooling stages), however size restraints for a supercharger limit the sizes of such entrance, intermediate and exit volumes.

SUMMARY OF THE INVENTION

In accordance with one embodiment of the present invention, a two-stage charge air cooler with an inlet-side core and an outlet-side core, each core having coolant conduits and fins for transmitting heat from a flow of pressurized air, has a fin density on the inlet-side core that is lower than the fin density on the outlet-side core. The term fin density as used herein means the percent of the total available cross-sectional flow area occupied by heat exchanging material such as fins and conduits. For simplicity, in a typical arrangement that has parallel coolant conduits linked by approximately equally spaced fins, we refer to fin density as the number of fins per inch of conduit length.

In one specific embodiment of the invention the fin density of the inlet-side core is on the order of 16-30 fins per inch, and the fin density of the outlet-side core is on the order of 40 fins per inch. As a ratio, the inlet-side core fins are about ⅔ as dense as the outlet-side core fins. In percentage terms, the inlet-side core is about 40-80% as dense as the outlet-side core. Mathematical calculations predict a 6-20% improvement (reduction) in air pressure drop in these embodiments over an embodiment with both cores having a fin density of 40 fins per inch. One can also understand, intuitively, that making the inlet-side core with too little density (e.g., with one fin) will detract too much from heat extraction, while making the inlet-side core with too great a density (e.g., one fin less than the outlet-side core) will offer too little change in pressure drop, so that a relative in-between density of about ⅔, or 40-80%, will produce best results.

In another aspect of the invention, because fin density on the inlet-side core is less, the fins on the inlet-side core are made more robust (thicker), increasing their strength and promoting greater fin durability. As the inlet-side core is nearest the rotors, where physical perturbations in air flow are greatest, significant durability gains are possible by lowering fin density in the inlet-side core. Lower fin density on the inlet-side core causes air flow resistance to be lessened as well.

In still another aspect of the invention, the fins on the inlet-side core promote lateral distribution of air flow from the region adjacent the rotor output in a direction toward the peripheral edges of the charge air cooler. Examples of fins promoting lateral air flow are perforated fins, serrated fins, and slanted (louvered) fins.

In still another aspect of the invention, a multi-stage charge air cooler (with three stages for example) has the core of each stage upstream of another stage with fins at lower density than in the core of the adjacent downstream stage.

In still another aspect of the invention, a supercharger comprises a housing, meshing rotors in sealing contact with the housing, the housing having an inlet port to admit air between the meshing rotors and an outlet port to expel air from the meshing rotors, the rotors accepting air from the inlet port and propelling it to the outlet port, a charge air cooler adjacent the outlet port to receive and transfer heat from the flow of air propelled through the outlet port by the rotors, the charge air cooler having an inlet-side core for transmitting the flow of air propelled by the rotors, and an outlet-side core receiving the flow of air transmitted from the inlet-side core and further transmitting the flow of air, each core having coolant conduits and fins joined to the coolant conduits for contact with the flow of air, the coolant conduits conducting a flow of coolant through the outlet-side core and through the inlet-side core, the fins being arranged with a predetermined density, and the inlet-side core fin density being lower than the outlet-side core fin density, whereby the inlet-side core presents less resistance to the flow of air than the outlet-side core and the outlet-side core presents greater surface area for heat conductance from the flow of air than the inlet-side core.

In still another aspect of the invention, a method of operating a supercharger comprises providing a housing with rotors sealingly mounted for rotation therein, accepting air into the housing from an inlet port and propelling it from the housing through an outlet port as the rotors are rotated, passing the air propelled from the housing outlet port through a charge air cooler having an inlet-side core and an outlet-side core spaced from the inlet-side core, each core having coolant conduits and fins joined to the coolant conduits for contact with the flow of air, arranging the fins in each core with a predetermined density, the inlet-side core fin density being lower than the outlet-side core fin density, first transmitting the flow of air propelled by the rotors through the inlet-side core with lower fin density and to the outlet-side core, and then transmitting the air received from the inlet-side core through the outlet-side core with greater fin density, whereby the inlet-side core presents less resistance to the flow of air than the outlet-side core and the outlet-side core presents greater surface area for heat conductance from the flow of air than the inlet-side core.

These and other aspects of the invention are more fully described below in connection with the drawings.

DESCRIPTION OF THE DRAWINGS

FIG. 3*i'* is an enlarged top view similar to FIG. 3*i* showing inlet-side core fins with increased thickness.

DETAILED DESCRIPTION OF THE INVENTION

Figure 1:
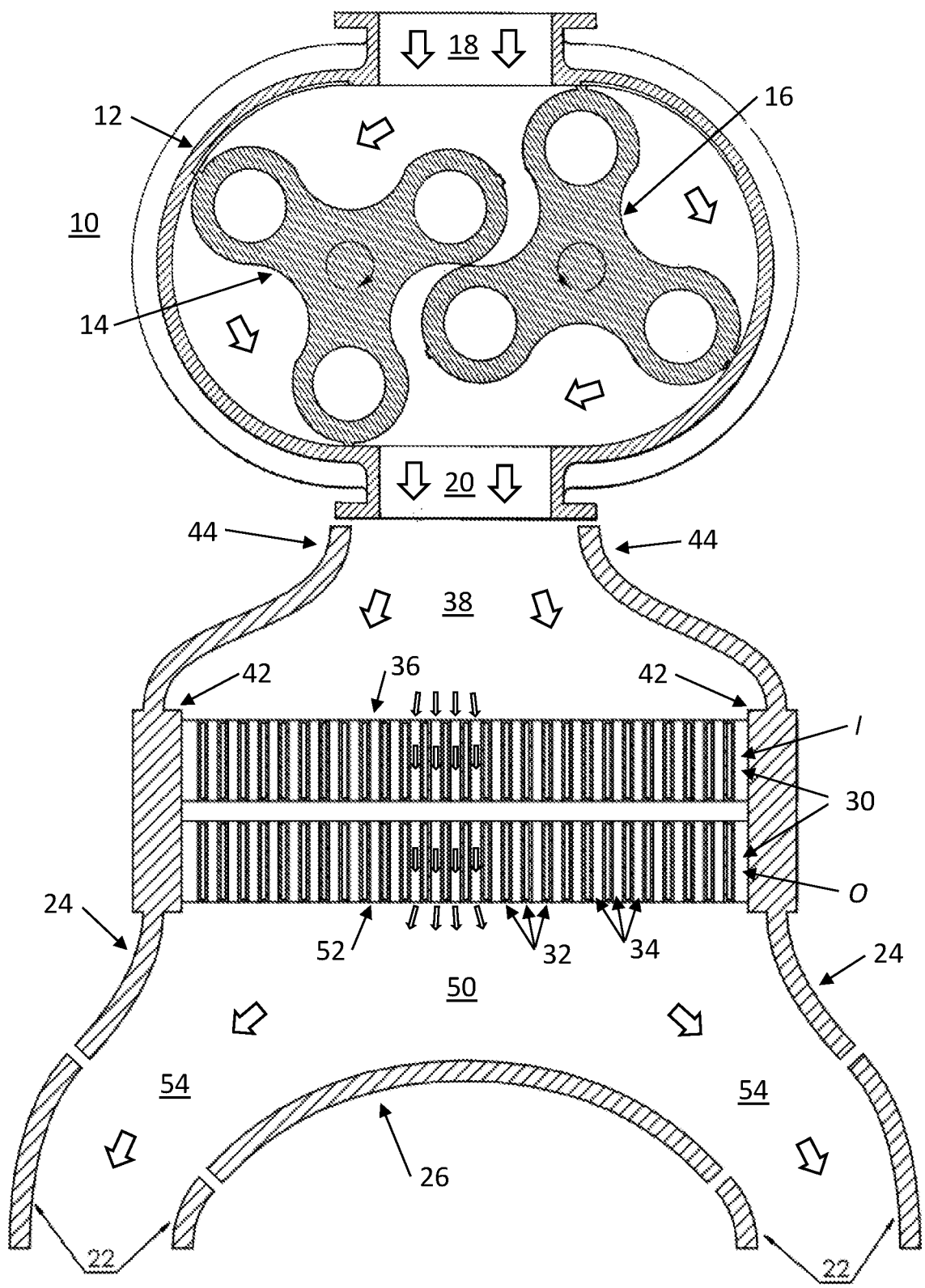
FIG. 1 is a schematic view of a Roots-type supercharger employing a charge air cooler according to the invention.

FIG. 1 illustrates schematically a cross-section of a Roots-type supercharger 10, which has a housing 12 in which meshing rotors 14, 16 are mounted for rotation, in sealing contact with the housing 12, and are driven by a belt connection to an engine crankshaft (not shown). Air is introduced into rotor housing 12 through an inlet port 18 at the inlet side of rotors 14, 16, and is pumped by the rotors to increase pressure and then discharged to rotor outlet port 20 adjacent to a charge air cooler 30 which is described generically here but will be described in further detail below. A typical charge air cooler 30 has an inlet array I and an outlet array O of parallel coolant conduits 32 (shown with greatly reduced density in FIG. 1 for ease of illustration) providing a recirculating coolant path to an external radiator (not shown), and the coolant conduits 32 are thermally linked by fins 34, which typically join two adjacent coolant conduits, and contact and extract heat from the flowing pressurized air before it is discharged from supercharger 10 to two banks of manifolds 22 porting the pressurized air to the combustion chambers of an engine with two banks of cylinders (not shown). The operation of the twisted rotors 14, 16, which for example may be Eaton TVS rotors, is well known to those in the supercharger art (see, e.g., U.S. Pat. No. 7,448,164).

As shown in FIG. 1 charge air cooler 30 has flanges 42 for sealingly attaching the charge air cooler to mounts 44 provided on rotor housing 12, so that all air passing through outlet port 20 passes through the charge air cooler 30. The rotor casing 12, mounts 44 and the inlet surface 36 of charge air cooler 30 define an entrance plenum or chamber 38 where pressurized air passing through outlet port 20 has an opportunity for flow to be equalized somewhat before entering charge air cooler 30. Nevertheless, as FIG. 1 illustrates, outlet port 20 has a much smaller cross-sectional area than the inlet surface 36 of charge air cooler 30 and consequently the strongest air flow from rotors 14, 16 is directed at a corresponding small cross-sectional area of inlet surface 36 of charge air cooler 30. As is known in the art, the air flow from rotors 14, 16 is both strong and pulsating and has the potential to damage fins 34 that are made thin in an effort to optimize thermal transfer and air flow.

Air exiting from charge air cooler 30 enters an exit plenum or chamber 50 defined by outlet surface 52 of charge air cooler 30 and cover 26, and then is directed to manifolds 22 via runner passages 54 defined by the inner surfaces of cover 26 and outer casing 24, and the outer surface of rotor housing 12. Fuel is added to the pressurized air delivered to the engine by manifolds 22 by means of injectors (not shown) mounted either in the manifold or in the combustion chambers (direct injection).

Figure 2:
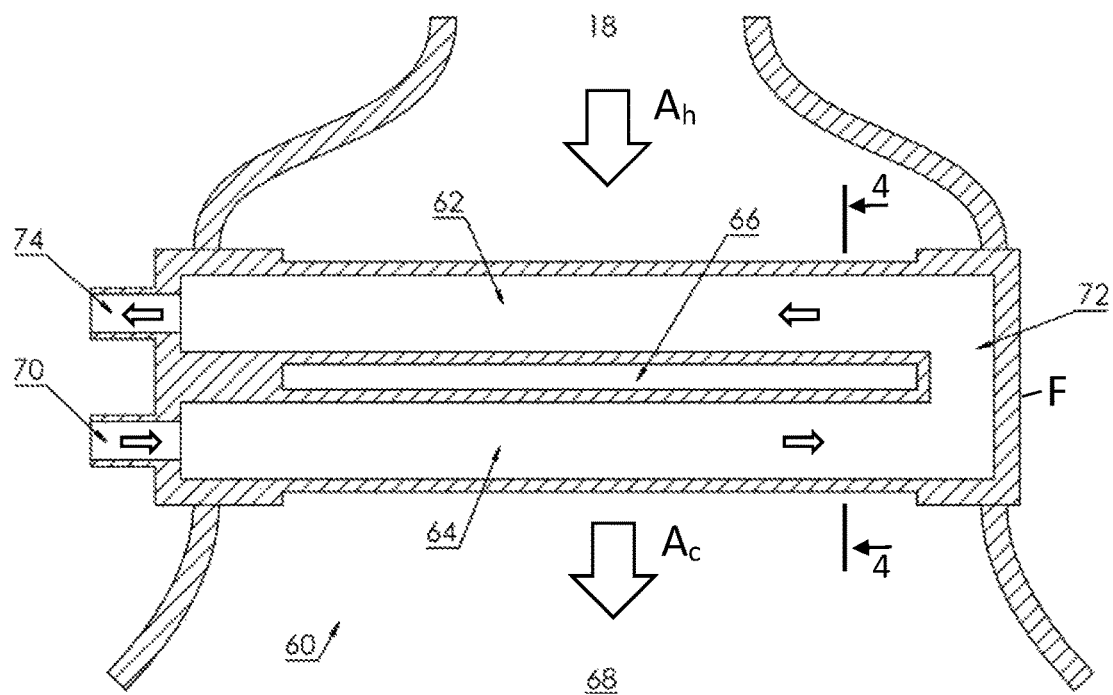
FIG. 2 is a schematic view of a charge air cooler according to the invention.

FIG. 2 shows a two-stage charge air cooler 60 according to the invention with an inlet-side core 62 (first stage) facing the rotor outlet port 18, and an outlet-side core 64 (second stage) adjacent the inlet-side core 62 and separated from it by intermediate space 66, to receive air passing through the inlet-side core 62 and then emitting the air to a plenum 68 that feeds the cooled pressurized air to the engine. The inlet-side core 62 and outlet-side core 64 typically present the same cross-sectional area to the air flow and conventionally are mounted in a peripheral frame F that both facilitates mounting of the charge air cooler 60 in the supercharger and maintains a sealed path for air to flow through cores 62, 64 without leakage. Heated pressurized air, represented by arrow Ah, is emitted from rotor port 18, passes through charge air cooler 60 where it is cooled, and exits the charge air cooler as cooled air, represented by arrow Ac, at lower temperature, lower volume and lower velocity and higher density to exit plenum 68. Coolant enters the charge air cooler 60 through inlet 70, travels first through the coolant conduits in outlet-side core 64, then through a internal passage 72 in frame F, and then through the coolant conduits in inlet-side core 62, and then exits though outlet 74 where it circulates through an external heat exchanger (not shown) to transfer stored heat to the external environment before being recirculated to inlet 70.

Cooling in charge air cooler 60 is a heat-exchange process in the cores 62, 64, in which cold water and hot air flow into the core. Inside the core, heat is transferred from the hot air to the cold water. Therefore the air cools down and the water heats up. When the air cools it also contracts. This means that the outlet air volume is smaller than the inlet air volume. As a result, air velocity entering is higher than air velocity exiting.

Heretofore, all the cores in multi-stage charge air coolers have uniform fin design and fin density throughout. Fin density, as used in this description, means the number of fins per inch positioned between adjacent coolant conduits, a standard measure used in radiator design. Because air decreases in both volume and velocity as it cools, and because flow restriction varies as the square of the air velocity, the air restriction through the inlet core of the charge air cooler is higher than the air restriction through the outlet core of the charge air cooler.

In accordance with the present invention, the charge air cooler uses different fin design and fin density for the inlet-side and outlet-side cores: the inlet-side core is arranged to have lower than average fin density and consequently less restriction of the air. (As a first approximation, fin density correlates with air restriction, but as those in the art understand, fin density and design both control the degree of air restriction.) The outlet-side core is arranged to have higher than average fin density and greater contact with the air, with greater heat transfer than the inlet-side core. Our calculations show that in one particular example of a Magnuson Products supercharged TVS-2650 Camaro, this would result in a 10% reduction in air pressure drop versus an average fin density. The same calculations show that reducing the fin density of the inlet-side core alone by 20% would result in a 20% overall reduction in total air pressure drop. These results would improve performance.

Figure 3I:
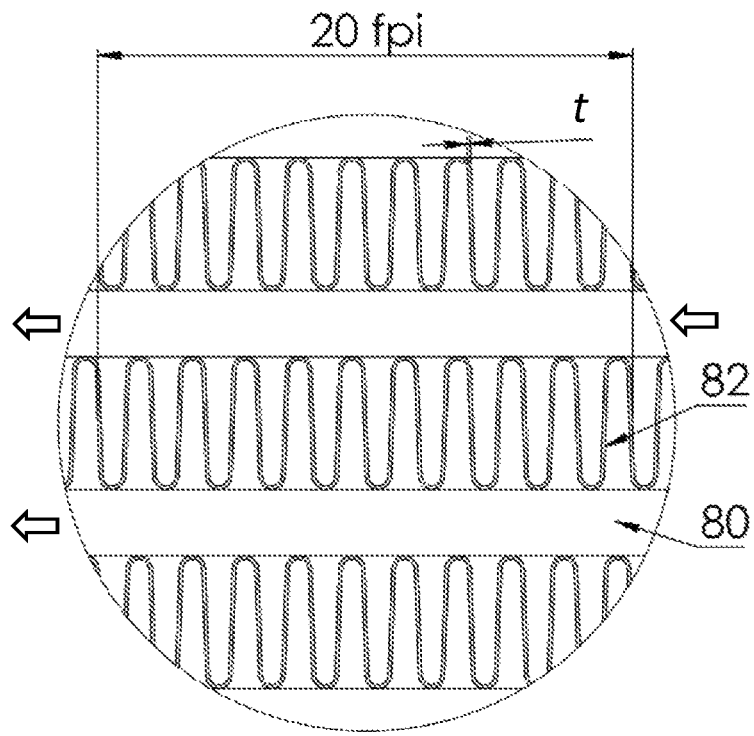
FIGS. 3*i* and 3*o* are enlarged top views of portions of the inlet-side core and outlet-side core of the charge air cooler of FIG. 2, showing the arrangement of coolant conduits and fins, with different fin densities.
Figure 3O:
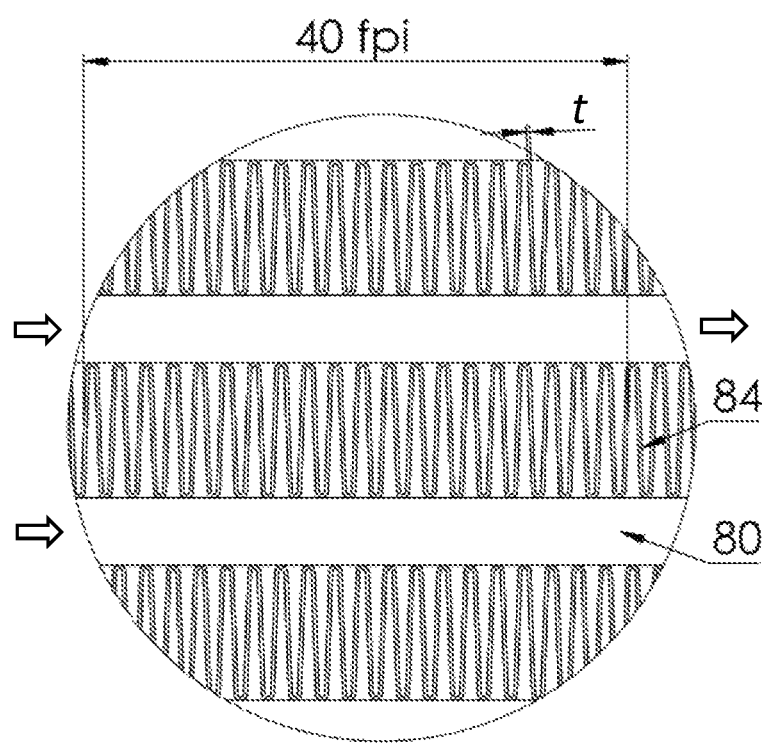

To illustrate different fin densities, FIGS. 3i and 3o are enlarged top views of a portion of the inlet-side core 62 and outlet-side core 64 respectively of the charge air cooler of FIG. 2, showing the arrangement of coolant conduits 80 and fins 82 (in inlet side core 62) and 84 (in outlet-side core 64), with different fin densities. In FIG. 3i, inlet-side core 62 has parallel coolant conduits 80 linked by fins 82 arranged in a continuous fold pattern and formed from a single strip of pleated metal that joins adjacent coolant conduits 80. While shown as a continuous fold, in a serpentine or sinusoidal fashion, fins alternatively can be folded or bent in an accordion or v-shape. Construction of cooling cores with conduits and fins in this manner is well known, and utilized in charge air coolers manufactured, e.g., by PWR Performance Products of Brisbane, Australia. As an example, the coolant conduits 80 are formed from two sheets of aluminum alloy, spaced apart about 0.05 inches and sealed at each end to form an interior passage for the coolant, and the conduits are spaced apart in the core about 0.3 inches. The fins 82, 84 linking the cooling conduits are formed from a strip of aluminum alloy approximately 1.5 inches wide and with a thickness t=0.004 inches, and folded to achieve the desired fin density. The fins in inlet-side core 62 are shown illustratively with a fin density of FPI=20, and the fins in outlet-side core 64 are shown illustratively with a fin density of FPI=40. The arrows adjacent the coolant conduits in FIG. 3i show direction of coolant flow, right to left. The arrows adjacent the coolant conduits in FIG. 3o show direction of coolant flow, left to right. Air flow would be perpendicular to the surface, in this case downward between fins. Coolant conduit and fin construction in outlet-side core 64 in FIG. 3o is shown to be similar to that in inlet-side core 62 shown in FIG. 3i, except that the fins are folded more closely together to achieve the higher fin density desired.

Another consideration in charge air cooler design is fin durability. As noted previously, the air discharged at the outlet of the supercharger by the rotors has large pulsations in flow and pressure. These pulsations can be severe enough that they can damage the fins of charge air cooler cores. High-density (or high restriction) fins are especially sensitive to this kind of damage. The GM ZR1 supercharger is an example of a product where these pulsations caused damage to the charge air cooler fins.

Fin durability would be increased by using more robust (thicker) fins on the inlet-side core for durability and higher density fins on the outlet-side of the core for greater heat transfer. This result would be achieved automatically in a situation where lower density cores are manufactured with thicker fins, and then the inlet-side core using lower fin density would automatically use thicker fins and the outlet-side core using higher fin density would use thinner fins. Typically, cores are manufactured with fins ranging from about 0.010 inches thick in low density cores to 0.002 inches thick in high density cores. Thus the desired result of more robust entry fins is readily achieved in the different density core configuration described earlier that also produces the advantage of a lower air pressure drop through the charge air cooler.

FIG. 3i' is a Figure similar to FIG. 3i except that the alternative fins 82' shown here are formed from a strip of aluminum alloy that has a thickness t'=0.006 inches, which is thicker than that used to form fins 82. (Those of skill in the art will appreciate that thicker fins will also, for a given fin density, reduce the size of the air flow paths through the cores and restrict air flow to a greater extent, but the effect will be smaller with lower fin density.)

Figure 4:
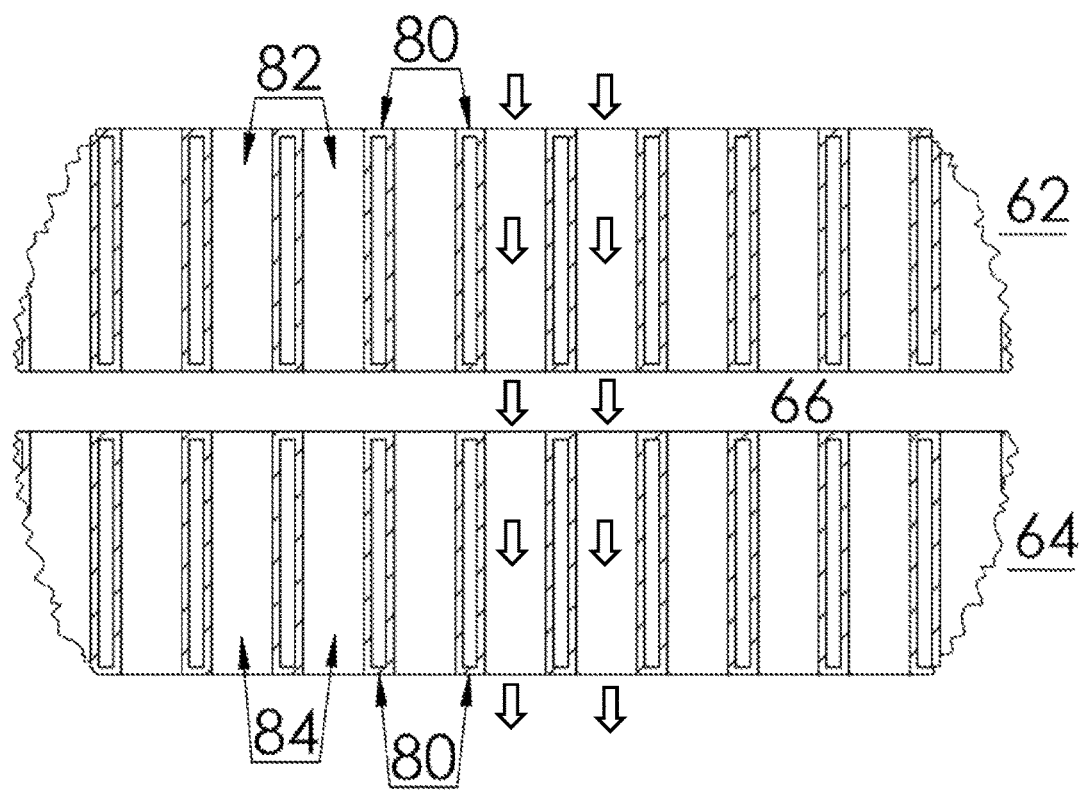
FIG. 4 is a cross-sectional view on line 4-4 of FIG. 2.

FIG. 4 is a section on line 4-4 of FIG. 2, with portions enlarged to show the internal construction of coolant conduits and fins. As shown in FIG. 4, the coolant conduits 80 conduct coolant in a direction that would be downward into the sheet in inlet-side core 62 and in a direction that would be upward out of the sheet in outlet-side core 64. Fins 82 and 84 have the same width (between adjacent coolant conduits 80) and air is transmitted between adjacent fins, as shown by arrows, through the inlet-side core 62, space 66, and outlet-side core 64.

The advantage of using fins of lower density in the inlet-side core than in the outlet-side core to reduce pressure drop can be determined mathematically, as shown by the following. The approach used was to first construct a simulated model using actual supercharger conditions of pressure, temperature, etc., at various locations in the supercharger and charge air cooler to determine conditions existing during typical operation; second to examine how pressure drops vary with fin density in different fin density cores in conditions similar to those found in the model; and third, to plug into the model different fin density cores with known pressure drops to determine how the model would behave when inlet-side cores have lower fin densities than outlet-side cores.

This simple simulation of the airflow through the supercharger and charge air cooler was constructed using the ideal gas law. This simulation assumes dry air, an insulated system, and no entropy loss, and the five conditions in the following table are considered. The charge air cooler consists of a two cooler cores. The first core is located between condition 3 and 4. The second core is located between condition 4 and 5. The model was checked with experimental test values to verify conditions 1, 2, 3, and 5.

The conditions are:

| | | | |
|---|---|---|---|
| #1 Ambient Condition | Temp 1 | 25 | deg C. |
| | Pressure 1 | 101 | kpa |
| | Flow Rate 1 | 1950 | CFM |
| | Density 1 | 1.187 | (kg/m^3) |
| | Number of Molecules | 37.701 | Moles |
| ▼ | | | |
| #2 Supercharger Rotor Inlet Condition | Temp 2 | 25 | deg C. |
| | Pressure 2 | 97 | kpa |
| | Flow Rate 2 | 2040 | CFM |
| | Density 2 | 1.187 | (kg/m^3) |
| ▼ | | | |
| #3 Supercharger Outlet Condition | Temp 3 | 160 | deg C. |
| | Pressure 3 | 248.9 | kpa |
| | Flow Rate 3 | 1155 | CFM |
| | Density 3 | 0.814 | (kg/m^3) |
| ▼ | | | |
| #4 Between Coolers Condition | Temp 4 | 100 | deg C. |
| | Pressure 4 | 245.45 | kpa |
| | Flow Rate 4 | 1009 | CFM |
| | Density 4 | 0.944 | (kg/m^3) |
| ▼ | | | |
| #5 After Cooler, Manifold Condition | Temp 5 | 40 | deg C. |
| | Pressure 5 | 242 | kpa |
| | Flow Rate 5 | 859 | CFM |
| | Density 5 | 1.129 | (kg/m^3) |

These values represent the physical conditions for a sample application. Air enters the charge cooler at condition #3 and exits the cooler at condition #5. The air entering the charge air cooler is at 160 degrees Celsius, 248.9 kPa, and 1155 CFM. The air exiting the charge air cooler is at 40 degrees Celsius, 242.0 kPa, and 859 CFM.

The air inlet face area of the charge air cooler for these calculations is 60.3 square inches. The approximate air flow rate through the cooler is 1000 CFM. Therefore, the approximate average flow rate through the cooler if the air is distributed evenly in this application is 16.6 CFM per square inch.

Next, test samples of different charge cooler fin configurations were tested on a flowbench and the pressure drops across the coolers were measured. The airflow rate through the coolers was maintained at approximately 16.6 CFM per square inch. This airflow rate matches the previously mentioned simulation. The following data were collected and show the relationship between cooler fin density and airflow restriction. Fin density is expressed as number of fins per inch (FPI).

| Fin Density (FPI) | Pressure Drop (in H2O) |
|---|---|
| 16 | 5.66 |
| 20 | 6.07 |
| 28 | 9.27 |
| 32 | 10.42 |
| 40 | 14.96 |

These data points substantially fit a linear relationship with Pdrop=0.3453*FPI.

We assume that the average airflow rates in the charge cooler cores are averages of the inlet and outlet air flow rate divided by the airflow face area. The flow rate in the first cooler then is approximately 17.9 CFM per square inch and approximately 15.5 CFM per square inch in the second cooler.

The pressure drop is estimated for two different charge coolers with input-side cores having lower fin densities that output-side cores, and compared with same-density cores. In Example A, calculations show a charge cooler that has medium density fins (28 FPI) in both cores versus a charge cooler with low density fins (16 FPI) in the first core and high density fins (40 FPI) in the second core. Both charge cooler configurations have the same total number of fins and therefore essentially the same heat transfer surface area. The advantage of using low density fins in the first cooler and high density fins in the second cooler is a 6% reduction in pressure drop.

|  | Cooler | FPI | Airflow Rate (CFM/sq-in) | Pressure Drop (In-H2O) |
|---|---|---|---|---|
| Example A | First Cooler Core (Medium Density) | 28 | 17.9 | 11.33 |
|  | Second Cooler Core (Medium Density) | 28 | 15.5 | 8.44 |
|  | Total pressure drop in cooler |  |  | 19.76 |
|  | First Cooler Core (Low Density) | 16 | 17.9 | 6.47 |
|  | Second Cooler Core (High Density) | 40 | 15.5 | 12.05 |
|  | Total pressure drop in cooler |  |  | 18.52 |
|  | Reduction in pressure drop |  |  | 6% |

Another application is to reduce the fin density in only the first cooler. Example B shows the result of reducing the fin density in the first cooler from 40 fins per inch to 20 fins per inch. This represents a 25% reduction in the total fin area but the benefit is a 29% reduction in pressure drop. Therefore this represents an overall benefit.

|  | Cooler | FPI | Airflow Rate (CFM/sq-in) | Pressure Drop (In-H2O) |
|---|---|---|---|---|
| Example B | First Cooler Core (High Density) | 40 | 17.9 | 16.18 |
|  | Second Cooler Core (High Density) | 40 | 15.5 | 12.05 |
|  | Total pressure drop in cooler |  |  | 28.23 |
|  | First Cooler Core (Medium Density) | 20 | 17.9 | 8.09 |
|  | Second Cooler Core (High Density) | 40 | 15.5 | 12.05 |
|  | Total pressure drop in cooler |  |  | 20.14 |
|  | Reduction in pressure drop |  |  | 29% |
|  | Reduction in total fin area |  |  | 25% |

These examples assume that the airflow through the charge air cooler is evenly distributed. In real life, the proximity of the supercharger discharge outlet to the inlet-side core face or the packaging constraints of various applications cause uneven airflow distribution. The first core could experience airflow rates that are double the average airflow rate. Even though the spacing between cores helps to equalize flow, the second core could have a 50% higher airflow rate than average. Example C displays a charge cooler experiencing these higher air flow rates that has medium density fins (28 FPI) in both cores versus a charge cooler with low density fins (16 FPI) in the first core and high density fins (40 FPI) in the second core. The resulting benefit of low and high density fins is 18% reduction in pressure drop.

|  | Cooler | FPI | Airflow Rate (CFM/sq-in) | Pressure Drop (In-H2O) |
|---|---|---|---|---|
| Example C | First Cooler Core (Medium Density) | 28 | 35.9 | 45.30 |
|  | Second Cooler Core (Medium Density) | 28 | 23.2 | 18.98 |
|  | Total pressure drop in cooler |  |  | 64.29 |
|  | First Cooler Core (Low Density) | 16 | 35.9 | 25.89 |
|  | Second Cooler Core (High Density) | 40 | 23.2 | 27.12 |
|  | Total pressure drop in cooler |  |  | 53.01 |
|  | Reduction in pressure drop |  |  | 18% |

An additional consideration is the effect of supercharger discharge pressure on discharge air temperature. At test conditions the supercharger discharge temperature increases approximately one degree Celsius for every 1 kpa of pressure increase. The unit conversion for pressure is 1 kpa equals 4 in-H2O. This equates to a 1 degree Celsius drop in discharge temperature for every 4 in-H2O pressure reduction. Therefore the resulting supercharger discharge temperatures in examples A, B, and C are 0.3, 2, and 2.8 degrees Celsius respectively. These benefits are in addition to the reduced pressure drops through the charge air coolers. Because the different density cores provide a lower pressure drop, the initial pressure (generated by the rotors) then can be smaller to achieve the same final pressure, and because the lower initial pressure corresponds to a lower initial temperature, that requires less cooling from the charge air cooler. Accordingly, a double benefit is achieved.

From these examples as well as other calculations, we have determined that there is a preferred range of fin densities for inlet-side and outlet-side cores. As a ratio, the inlet-side core fins that are about ½ to ⅔ as dense as the outlet-side core fins produce advantageous results. In percentage terms, inlet-side cores that are about 40-80% as dense as outlet-side cores produce advantageous results. Mathematical calculations predict a 6-20% improvement (reduction) in air pressure drop in these ranges. One can also understand, intuitively, that making the inlet-side core with too little density (e.g., with one fin) will detract too much from heat extraction capabilities, while making the inlet-side core with too great a density (e.g., one fin less than the outlet-side core) will offer too little change in pressure drop, so that a relative in-between density of about ⅔, or 40-80%, will produce advantageous results.

Furthermore, we have noted that because air decreases in both volume and velocity as it cools, and because flow restriction varies as the square of the air velocity, the air restriction through the inlet core of the charge air cooler is higher than the air restriction through the outlet core of the charge air cooler when both cores have the same fin density. One way to design a charge air cooler then would be to have the inlet-side core have a lower fin density than the outlet-side core in such a ratio of fin densities that the air restriction (pressure drop) is the same in each of the two cores. Such an arrangement, which is very close to what Example C above depicts, may yield highly beneficial results.

Figure 5:
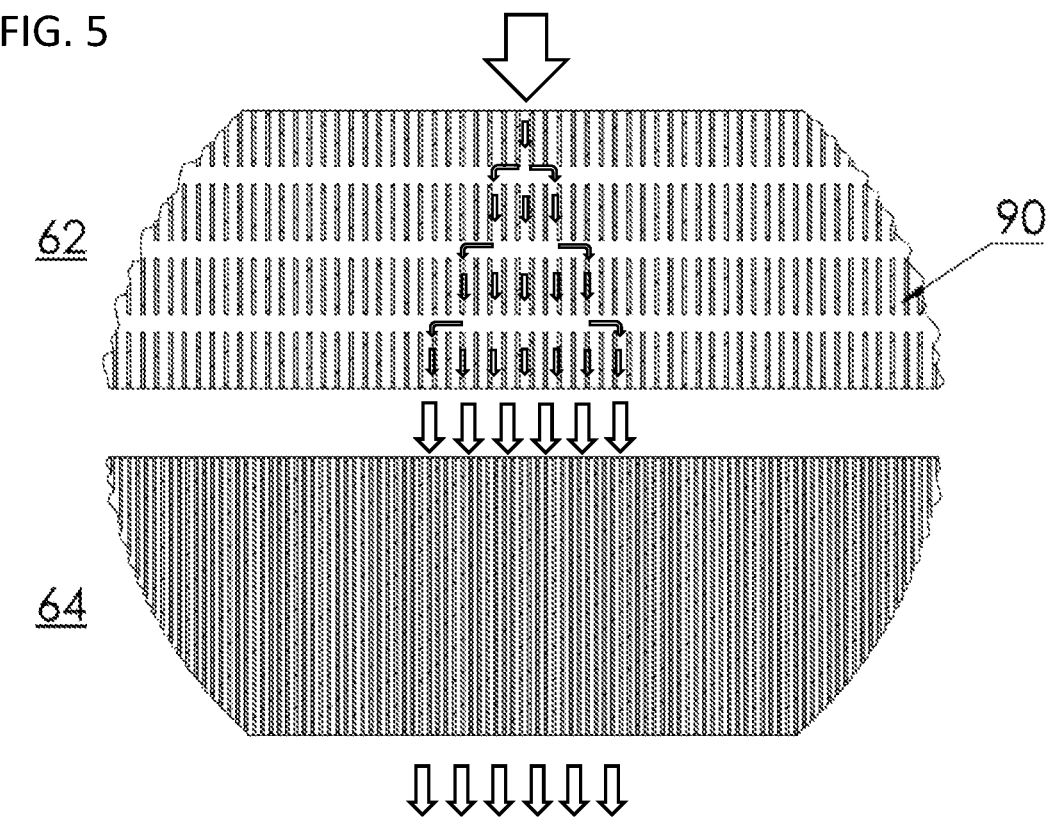
FIGS. 5, 6 and 7 are side views of fins promoting lateral air flow.
Figure 6:
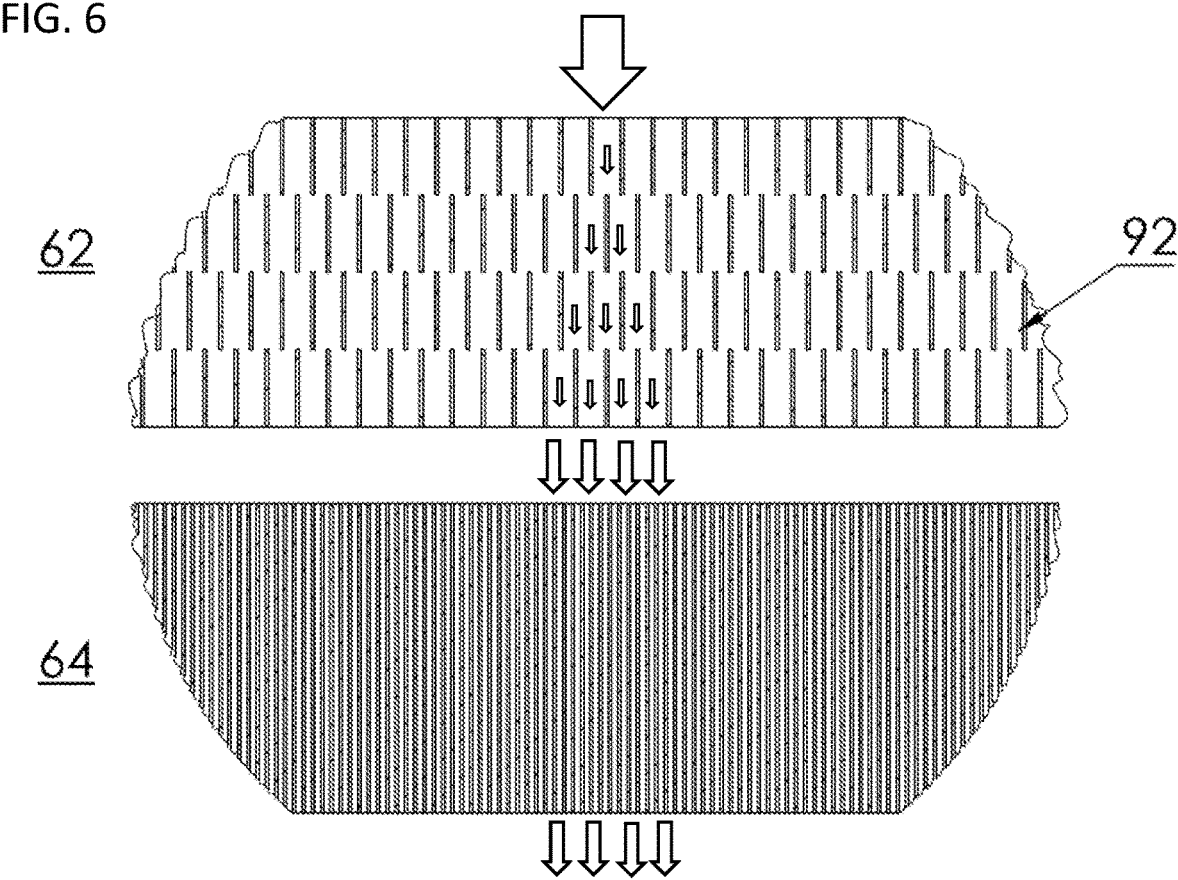
Figure 7:
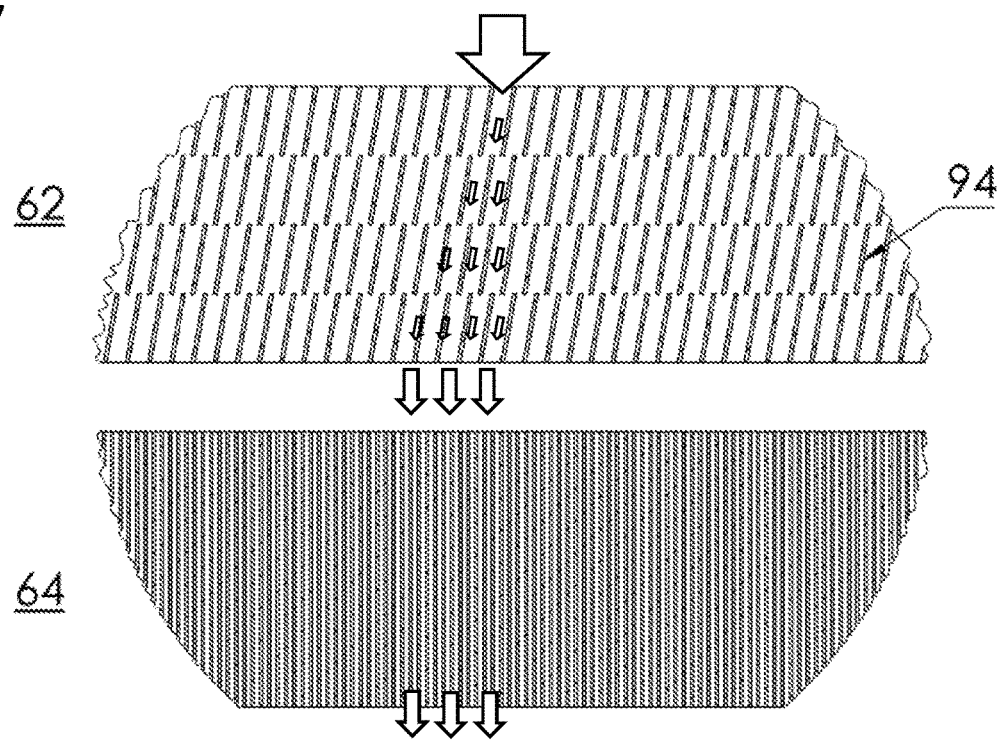

As noted in the description of FIG. 1 it is desirable to have uniform air flow across the charge air cooler and typically the air discharged by the rotors is concentrated over an area smaller than the surface of the charge air cooler. To enhance flow laterally away from this concentrated area, and to make it more uniform as it passes through the cores, the embodiments of the invention shown in FIGS. 5, 6 and 7 show flow-directing fin constructions that facilitate this. FIGS. 5, 6 and 7 show, respectively, perforated fins 90, serrated fins 92, and unidirectional louvered (slanted) fins 94 used to direct air flow laterally away from the region near rotor outlet 20 and in a direction toward the periphery of cores 62, 64. Typically, these flow directing fins would be used in the lower fin density inlet-side core 62, where the lower fin density would advantageously increase the effectiveness of the flow-directing fins, and where the need for lateral flow is greatest. Such flow-directing fins are known in the art.

Figure 3I:
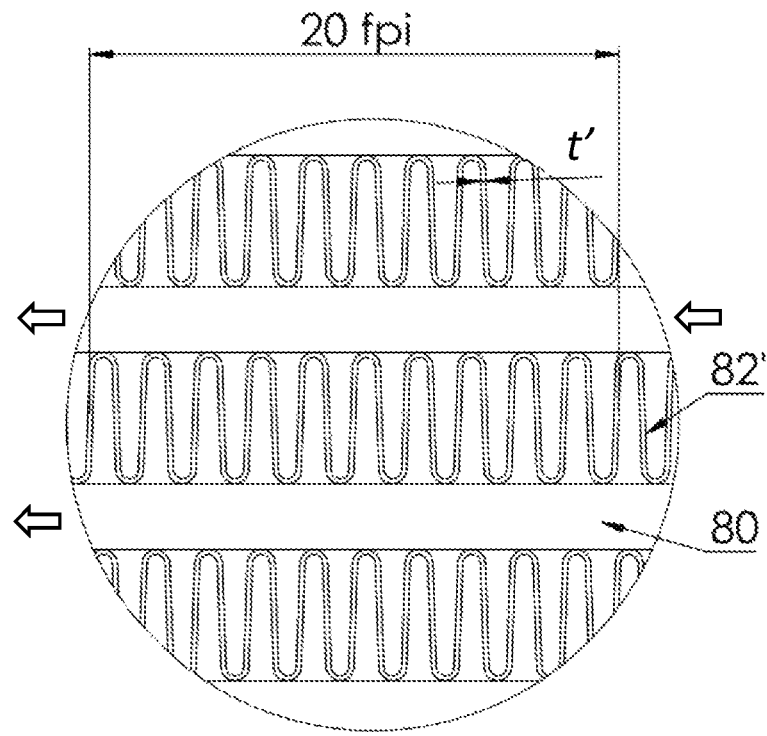
Figure 8:
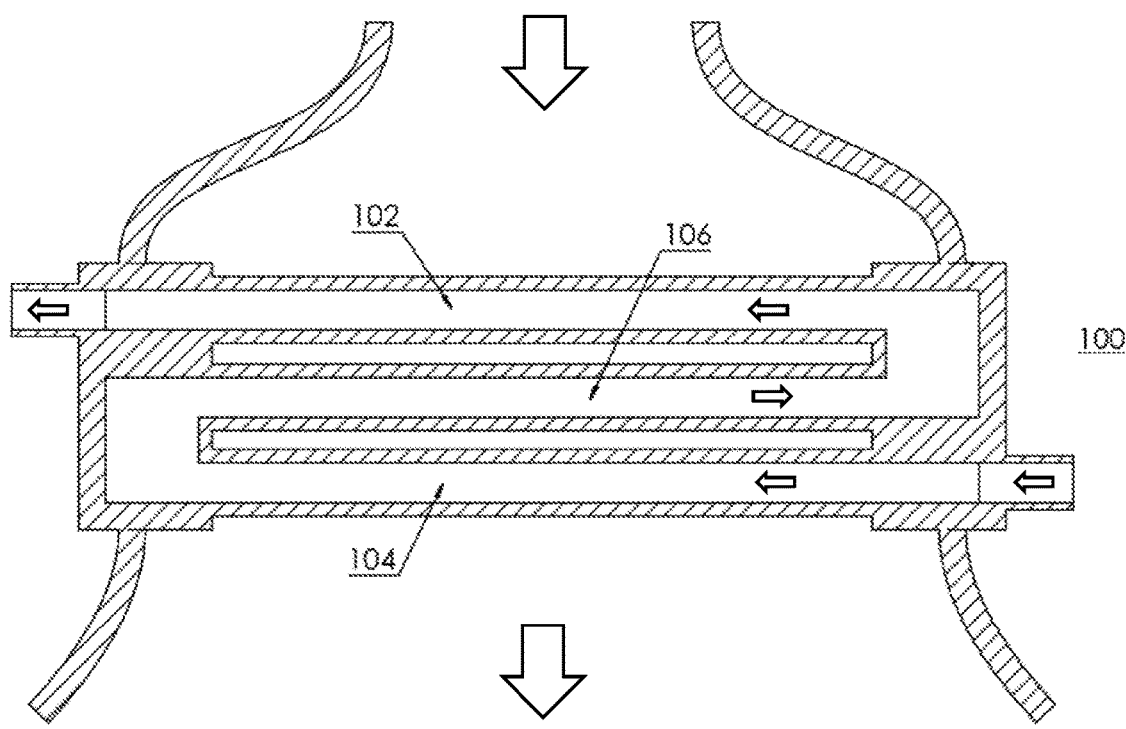
FIG. 8 is a schematic view, similar to FIG. 2, but illustrating a three-stage charge air cooler.

FIG. 8 shows a three-stage charge air cooler 100 with inlet-side core 102, central core 106, and outlet-side core 104, each core being formed of coolant conduits linked by fins as previously described with reference to FIGS. 2-4. In accordance with the invention, in this multi-stage charge air cooler each core that is upstream of another core has a lower fin density than the cores downstream of that core. Thus in a multi-stage charge air cooler flow conditions can be changed in several stages, not just two. As an example, inlet-side core 102 could have a fin density of 16 fins per inch, central core 106 could have a fin density of 28 fins per inch, and outlet-side core 104 could have a fin density of 40 fins per inch.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. A charge air cooler for extracting heat from a flow of pressurized air, the charge air cooler comprising:
   an inlet-side core for transmitting the flow of pressurized air, and an outlet-side core receiving the flow of pressurized air transmitted from the inlet-side core and further transmitting the flow of pressurized air, each core having coolant conduits and fins joined to the coolant conduits for contact with the flow of pressurized air, the fins being arranged with a predetermined density, and wherein:
   the inlet-side core fin density is lower than the outlet-side core fin density, whereby the inlet-side core presents less resistance to the flow of pressurized air than the outlet-side core and the outlet-side core presents greater surface area for heat conductance from the flow of pressurized air than the inlet-side core,
   the inlet-side core receives the flow of pressurized air in a central location, and
   the fins in the inlet-side core direct the flow of pressurized air laterally from the central location toward the periphery of the core,
   whereby the flow of pressurized air transmitted from the outlet-side core is more evenly distributed over its area.

2. The charge air cooler as claimed in claim 1 wherein:
   the fins directing the flow of pressurize air laterally from the central location toward the periphery of the core are selected from the group consisting of: perforated fins, serrated fins, and slanted fins.

3. A supercharger for supplying pressurized air to an engine including:
   a housing,
   meshing rotors with their outer surfaces in sealing contact with the housing, the housing having an inlet port to admit air between the meshing rotors and an outlet port to expel pressurized air from the meshing rotors, the rotors accepting air from the inlet port and propelling it in a heated and pressurized state to the outlet port as the rotors are rotated, and
   a charge air cooler adjacent the outlet port to receive and remove heat from the flow of pressurized air propelled through the outlet port by the rotors in order to reduce the temperature and increase the density of the pressurized air supplied to the engine,
   wherein the charge air cooler comprises:
      an inlet-side core for transmitting the flow of air propelled by the rotors, and
      an outlet-side core spaced from the inlet-side core to form an air chamber therebetween and receiving the flow of heated and pressurized air transmitted from the inlet-side core and further transmitting the flow of air,
      each core having
      coolant conduits extending transversely to the flow of air, the coolant conduits conducting a flow of liquid coolant through the coolant conduits in the outlet-side core and the inlet-side core, and
      fins joined to the coolant conduits for contact with the flow of air, the fins being arranged with a predetermined density, and
      the inlet-side core fin density being lower than the outlet-side core fin density, whereby the inlet-side core presents less resistance to the flow of air than the outlet-side core and the outlet-side core presents greater surface area for heat conductance from the flow of air than the inlet-side core,
      the different fin densities providing a first pressure drop in the inlet-side core and a second pressure drop in the outlet-side core and a first temperature drop in the inlet-side core and a second temperature drop in the outlet-side core such that the combined pressure and temperature drops in the two cores produce a lower pressure drop and higher temperature drop than in inlet-side and outlet-side cores with identical fin density, for more efficient operation of the charge air cooler.

4. The supercharger as claimed in claim 3 wherein:
the inlet-side core is spaced from the outlet port to form an air chamber therebetween,
the housing has exit passages to transmit the pressurized air to the engine,
the outlet-side core is spaced from the exit passages to form an air chamber therebetween,
each core has substantially parallel coolant conduits with spaced fins linking two adjacent coolant conduits, the spaces between fins providing a path for the flow of air, and
the different fin densities are obtained by providing spacing between fins on the inlet-side core that is greater than the spacing between fins on the outlet-side core.

5. The supercharger as claimed in claim 4 wherein:
the inlet-side core fin density is about ½ to ⅔ of the fin density of the outlet-side core.

6. The supercharger as claimed in claim 4 wherein:
the inlet-side core fin density is from about 40% to 80% of the fin density of the outlet-side core.

7. The supercharger as claimed in claim 4 wherein:
the inlet-side core receives the flow of air propelled by the rotors in a central location, and
the fins in the inlet-side core direct the flow of air laterally from the central location toward the periphery of the core,
whereby the flow of pressurized air transmitted to the outlet-side core is more evenly distributed over its area.

8. The supercharger as claimed in claim 3 wherein:
the different core fin densities produce a pressure drop across the inlet-side core that is the same as the pressure drop across the outlet-side core.

9. The supercharger as claimed in claim 4 wherein:
the lower density inlet-side core fins are thicker than the outlet-side core fins, whereby the thicker inlet-side core fins receiving the air propelled by the rotors are able to provide enhanced durability.

10. A method of operating a supercharger to supply pressurized air to an engine, comprising;
providing a housing with rotors sealingly mounted for rotation therein;
accepting air into the housing from an inlet port and propelling it in a heated and pressurized state from the housing through an outlet port as the rotors are rotated,
passing the air propelled from the housing outlet port through a charge air cooler having an upstream core and a downstream core spaced from the upstream core to form an air chamber therebetween, each core having coolant conduits for conducting a flow of liquid coolant transversely to the flow of air and fins joined to the coolant conduits for contact with the flow of air,
arranging the fins in each core with a predetermined density, the upstream core fin density being lower than the downstream core fin density,
first transmitting the flow of air propelled by the rotors through the upstream core with lower fin density, through the air chamber and to the outlet-side core, and
then transmitting the air received from the upstream core through the downstream core with greater fin density and to the engine,
whereby the upstream core presents less resistance to the flow of air than the downstream core and the downstream core presents greater surface area for heat conductance from the flow of air than the upstream core,
the different fin densities providing a first pressure drop in the upstream core and a second pressure drop in the downstream core and a first temperature drop in the upstream core and a second temperature drop in the downstream core such that the combined pressure and temperature drops in the two cores produce a lower pressure drop and higher temperature drop than in upstream and downstream cores with identical fin density, for more efficient operation of the charge air cooler.

11. The method claimed in claim 10 wherein
the different core fin densities produce a pressure drop across the inlet-side core that is the same as the pressure drop across the outlet-side core.

12. The method claimed in claim 10 wherein:
the upstream core fin density is from about 40% to 80% of the fin density of the downstream core.

* * * * *